United States Patent
Mao et al.

(10) Patent No.: US 8,394,291 B2
(45) Date of Patent: *Mar. 12, 2013

(54) PROCESS FOR MAKING FLUORINATED LITHIUM VANADIUM POLYANION POWDERS FOR BATTERIES

(75) Inventors: Zhenhua Mao, Ponca City, OK (US);
Mark W. Carel, Ponca City, OK (US);
Daniel H. Irvin, Fulshear, TX (US);
David W. Westphal, Houston, TX (US)

(73) Assignee: Phillips 66 Company, Houston, TX (US)

( * ) Notice: Subject to any disclaimer, the term of this patent is extended or adjusted under 35 U.S.C. 154(b) by 558 days.

This patent is subject to a terminal disclaimer.

(21) Appl. No.: 12/640,894

(22) Filed: Dec. 17, 2009

(65) Prior Publication Data
US 2010/0155656 A1 Jun. 24, 2010

Related U.S. Application Data

(60) Provisional application No. 61/139,342, filed on Dec. 19, 2008.

(51) Int. Cl.
*H01M 4/88* (2006.01)
*H01B 1/02* (2006.01)
(52) U.S. Cl. ............ 252/182.1; 29/623.5; 252/518.1; 252/519.51; 252/520.21; 252/520.4; 252/521.2; 423/306; 423/641; 427/215
(58) Field of Classification Search ............ 29/623.5; 252/182.1, 513, 518.1, 519.51, 520.21, 520.4, 252/521.2; 423/306, 641; 429/220, 231.5; 527/215; 427/215
See application file for complete search history.

(56) References Cited

U.S. PATENT DOCUMENTS

| 6,387,568 | B1 | 5/2002 | Barker et al. | |
|---|---|---|---|---|
| 6,645,452 | B1 | 11/2003 | Barker et al. | |
| 6,777,132 | B2 | 8/2004 | Barker et al. | |
| 6,855,462 | B2 | 2/2005 | Barker et al. | |
| 6,960,331 | B2 | 11/2005 | Barker et al. | |
| 2007/0238021 | A1 | 10/2007 | Liu et al. | |
| 2008/0008938 | A1 | 1/2008 | Wu et al. | |
| 2008/0303004 | A1 | 12/2008 | Mao | |
| 2008/0305256 | A1* | 12/2008 | Kimble et al. | ............ 427/215 |

OTHER PUBLICATIONS

Zhong Sheng-kui, Yin Zhou-lan, Wang Zhi-xing, Chen Qi-yuan, Synthesis and characterization of triclinic structural LiVPO4F as possible 4.2 V cathode materials for lithium ion batteries, J. Cent. South Univ. Technol. (2007)03-0340-04.*
PCT/US2009/068534 International Search Report (Form PCT/ISA/220) dated Apr. 9, 2010.
Yuzhan Li, et al. "A novel sol-gel method to synthesize nanocrystaline LiVP04 and its electrochemical Li intercalation performances" J. Power Sources, vol. 160, Mar. 2, 2006, pp. 633-637.

* cited by examiner

*Primary Examiner* — Bijan Ahvazi
(74) *Attorney, Agent, or Firm* — Phillips 66 Company

(57) ABSTRACT

Processes produce a lithium vanadium fluorophosphate or a carbon-containing lithium vanadium fluorophosphate. Such processes include forming a solution-suspension of precursors having $V^{5+}$ that is to be reduced to $V^{3+}$. The solution-suspension is heated in an inert environment to drive synthesis of $LiVPO_4F$ such that carbon-residue-forming material is also oxidized to precipitate in and on the $LiVPO_4F$ forming carbon-containing $LiVPO_4F$ or CLVPF. Liquids are separated from solids and a resulting dry powder is heated to a second higher temperature to drive crystallization of a product. The product includes carbon for conductivity, is created with low cost precursors, and retains a small particle size without need for milling or other processing to reduce the product to a particle size suitable for use in batteries. Furthermore, the process does not rely on addition of carbon black, graphite or other form of carbon to provide the conductivity required for use in batteries.

14 Claims, 5 Drawing Sheets

PROCESS FOR MAKING FLUORINATED LITHIUM VANADIUM POLYANION POWDERS FOR BATTERIES

CROSS-REFERENCE TO RELATED APPLICATIONS

This application claims benefit of U.S. Provisional Application No. 61/139,342.

STATEMENT REGARDING FEDERALLY SPONSORED RESEARCH OR DEVELOPMENT

None

FIELD OF THE INVENTION

This invention relates to materials for use in a positive electrode of lithium-ion batteries and processes for making such materials.

BACKGROUND OF THE INVENTION

Lithium-ion batteries are recognized and valued for high efficiency, energy density, high cell voltage and long shelf life and have been in commercial use since the early 1990's. As always though, there is a desire to make better batteries for less cost. One area that has enjoyed a lot of technical development is in the area of the cathode material. Many chemistries for the cathode material have been suggested that provide different strengths among the many important performance characteristics for lithium-ion batteries. One interesting chemistry that has been proposed in U.S. Pat. No. 6,387,568, among other places, is lithium metal fluorophosphates. Lithium metal fluorophosphates are interesting in that they are expected to have a nominal electrode potential of about 4.2 volts and a theoretical capacity of about 150 mAh/g. These attributes are better than other lithium metal polyanionic compounds including $LiFePO_4$.

However, it has been considered that the process for making lithium metal fluorophosphates is difficult. For this attractive material to be commercialized, developments for high quality and low cost manufacturing will be important. As noted above, any improvements for batteries, whether better performance, longer life or lower cost is a welcome and desired improvement.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Embodiments relate to processes of producing a lithium vanadium fluorophosphate or a carbon-containing lithium vanadium fluorophosphate. Such processes include forming a solution-suspension of precursors having $V^{5+}$ that is to be reduced to $V^{3+}$. The solution-suspension is heated in an inert environment to drive synthesis of $LiVPO_4F$ such that carbon-residue-forming material is also oxidized to precipitate in and on the $LiVPO_4F$ forming carbon-containing $LiVPO_4F$ or CLVPF. Liquids are then separated from solids and a resulting dry powder is heated to a second higher temperature to drive crystallization of a product. The product includes carbon for conductivity, is created with low cost precursors, and retains a small particle size without need for milling or other processing to reduce the product to a particle size suitable for use in batteries. Furthermore, the process does not rely on addition of carbon black, graphite or other form of carbon to provide the conductivity required for use in batteries.

To aid in the discussion and understanding of the invention as it relates to various parameters and qualities for batteries, several definitions are provided for comparison of the materials of embodiments of the invention with prior art materials or materials from prior art methods.

As used herein, the following terms have their usual meanings in the art and are intended to specifically include the following definitions:

Capacity (mAh/g): The amount of electrical charge that can be stored in and released from a given electrode material per unit weight within a certain defined electrode potential window.

Coulombic Efficiency (%): The ratio of the amount of electrical charge discharged from an electrode material to the amount of electrical charge that is used to charge the electrode to the state before discharge.

A "carbon-residue-forming material" (CRFM) is any material which, when thermally decomposed in an inert atmosphere to a carbonization temperature of 600° C. or an even greater temperature, forms a residue which is substantially carbon. "Substantially carbon", as used herein, indicates that the material is at least 95% carbon by weight.

"Carbonization" is a process that converts a carbon-residue-forming materials to a material that is characterized as being "substantially carbon".

Figure 1:
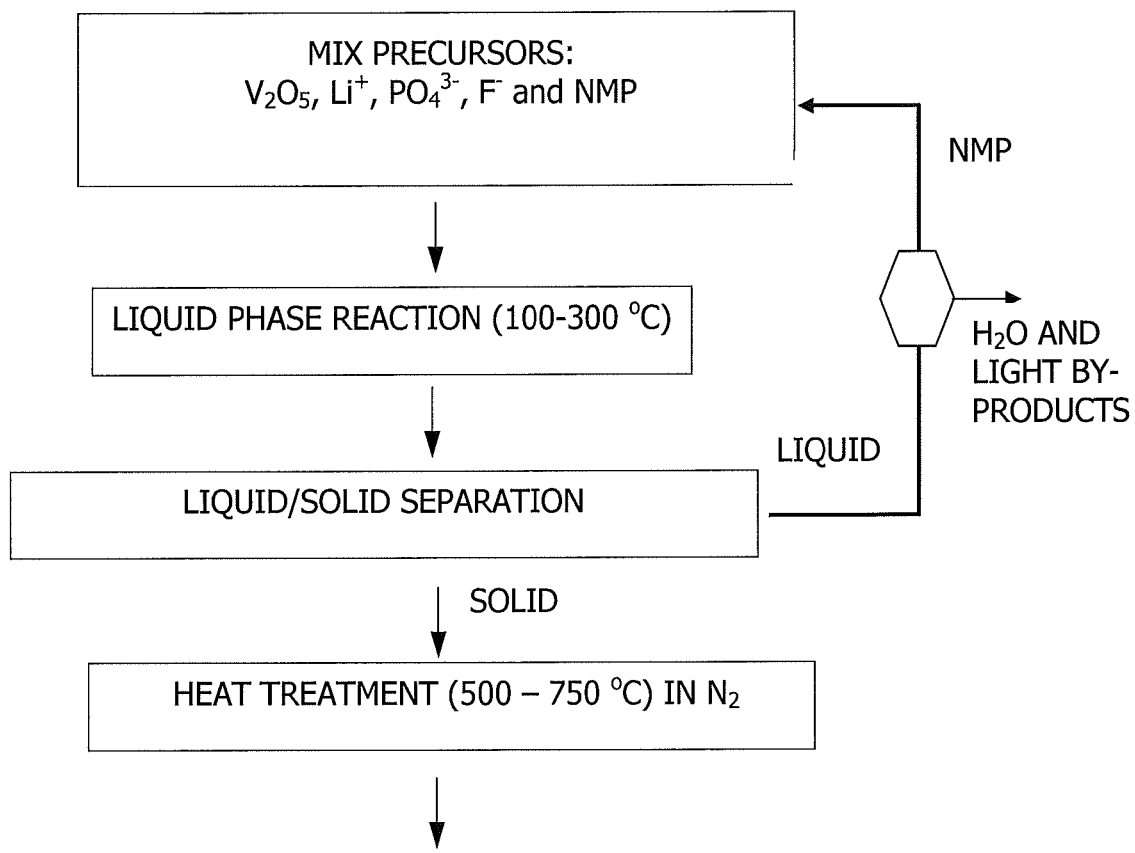
FIG. 1 is a block diagram showing the inventive process for making a desired form of lithium metal fluorophosphate.
Figure 2:
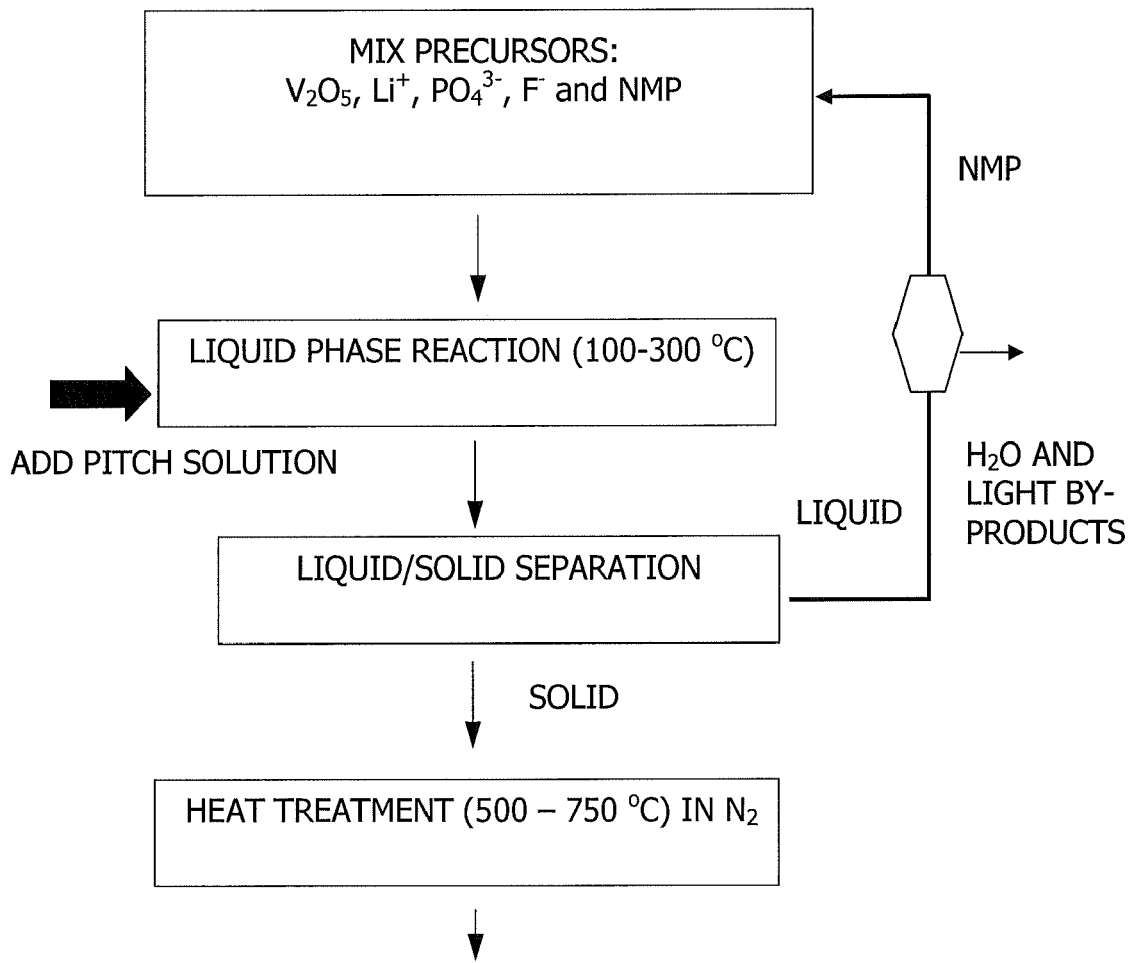
FIG. 2 is a block diagram showing an alternative embodiment of the inventive process for making lithium metal fluorophosphate.

Turning now to the Figures, FIG. 1 shows a process flow diagram according to this invention. The process consists of the following steps or sub processes: a) mixing precursors, b) reacting the powder/solvent mixture at moderate temperatures to yield solid powder, c) separating the solid powder from liquid, d) heating the solid powder at elevated temperatures. FIG. 2 shows an alternative process diagram. In this process, carbon-yielding hydrocarbons or carbon-residue-forming materials are added into the reaction solution so that portion of the carbon-yielding hydrocarbon would precipitate or form on solid particles. In another alternative arrangement shown in FIG. 3, the carbon-yielding hydrocarbons, such as petroleum pitch, can be coated on solid particles after the powder has been heated and then heated in a further step to form carbon on or with the solid particles. The inventors believe that the carbon is generally on the surface, but for the sake of clarity, desire to describe the particles as containing carbon since carbon is bound with the particles in small amounts of between one and ten percent and more preferably between one and three percent.

It is known that many other cathode powders have electrically conductive particles such as carbon black and graphite, etc. added so as to improve the electrical conductivity. However, until the cathode powder is applied to the metallic cathode foil by a binder, the conductive additive carbon particles are not bound to the cathode powder. It is believed that the carbon being bound to the cathode powder particles in the process of making the cathode powder makes the powder better in that the conductivity is inherent in all, or substantially all of the particles of the powder. The conductive additive carbon particles in other systems are only connected to the particles of the cathode powder by the binder used to apply the cathode powder to the metallic cathode foil.

Each of the above briefly described steps are described in more detail as follows:

Mixing Precursors

In some embodiments, the precursors include: (a) five valence vanadium oxide ($V_2O_5$) or ammonium vanadium oxide ($NH_4VO_3$), sometimes also referred to as ammonium metavanadate, powders as the vanadium source; (b) lithium carbonate ($Li_2CO_3$), lithium hydroxide (LiOH), or lithium fluoride as the lithium source, (c) phosphoric acid ($H_3PO_4$) as the phosphate source, (d) lithium fluoride (LiF) or hydrofluoric acid (HF) as the fluoride source, and (e) n-methyl pyrrolidinone (NMP) as the solvent and also as the reducing agent. Water ($H_2O$) is also preferably added as solvent and as reactant. Except for the NMP and water, the other precursors are added in the required stoichiometric proportion. The amount of NMP and water is determined by the viscosity of the resulting slurry. It is desirable to disperse solid $V_2O_5$ particles uniformly in NMP and dissolve most of other precursors in NMP.

Reacting the Mixture in the Solvent Mixture

This operation causes a chemical reduction of the five valence vanadium to three valence vanadium and simultaneously causes the precipitation of solid particles that have a stoichiometric composition close to $LiVPO_4F$. For some embodiments, the operating temperature is between 200° C. and 300° C. In some embodiments, the operating pressure is below 500 psig.

Figure 3:
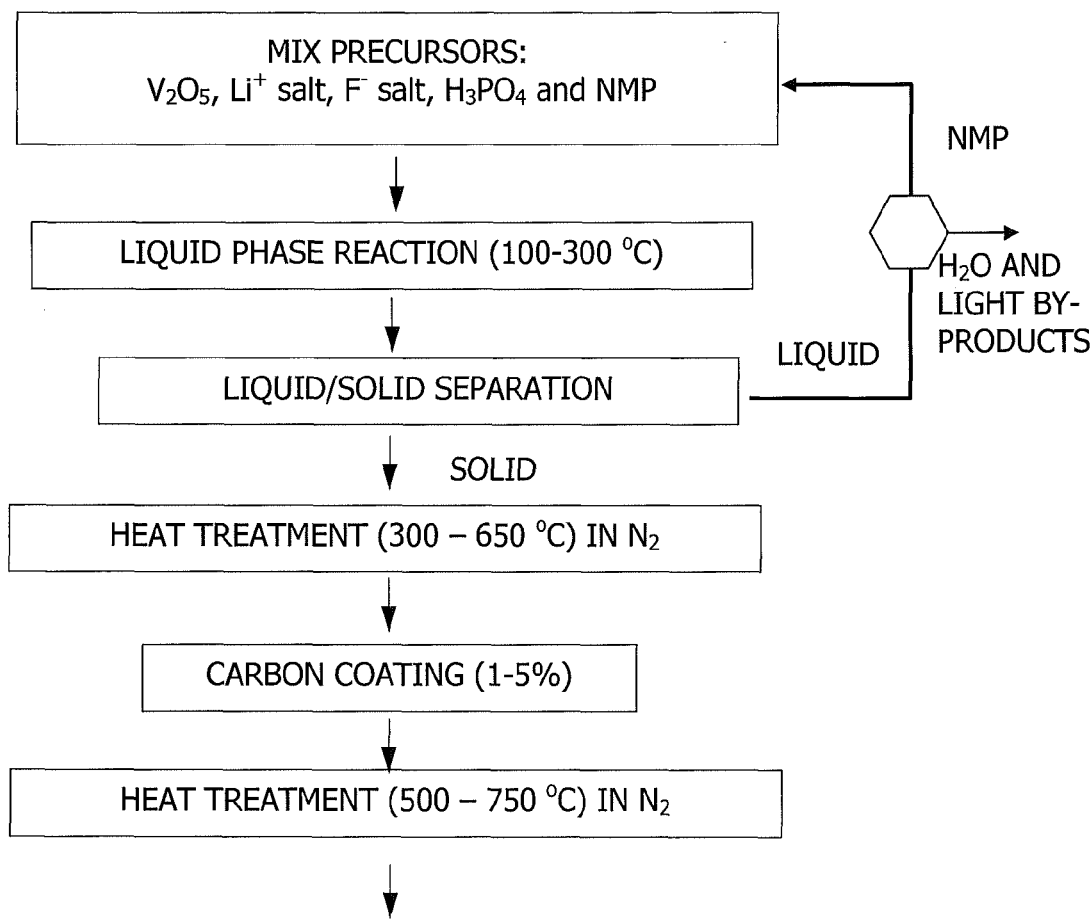
FIG. 3 is a block diagram showing a second alternative embodiment of the inventive process for making lithium metal fluorophosphate.

In addition to producing the desired $LiVPO_4F$, the process produces useful by-products including large carbon-yielding hydrocarbons that may precipitate out or remain dissolved in the liquid. These carbon-yielding hydrocarbon by-products are very useful as the carbon source when the solid powder is heat-treated in a subsequent step. In the alternative process as shown in FIG. 2, a carbon-yielding hydrocarbon, such as petroleum pitch, is added into the solution at the second step or step b) either before the reaction or after the reaction, a certain portion of the added hydrocarbons would precipitate out from the solution on solid particles. If separation of solid particles from the liquid is through evaporation, both the added hydrocarbons and large hydrocarbon by-products become the carbon source in the final powder. In the alternative process as shown in FIG. 3, the carbon-yielding hydrocarbons are applied after solid particles have been dried and heat-treated in an inert environment. In all these cases, it is desirable to control the final carbon content in the total solid powder to be between 0.5 and 10%, or between 1% and 5%.

Separating the Solid Powder from Liquid

Any convention physical method can be used for this operation, but evaporation of liquid and mechanical filtration provides two exemplary separation methods.

Heat Treatment

This step involves heating the powder at a temperature higher than 300° C. in an inert atmosphere to form the desired crystalline structure of solid particles and convert hydrocarbons to elemental carbons contained on or in the particles. In some embodiments, the temperature is between 500 and 800° C., or between 600 and 750° C.

EXAMPLES

Example 1

The precursors were measured with 16.0 grams of $V_2O_5$ powder (99.2%, Alfa Chemical), 4.7 grams of lithium fluoride (99.98% from Aldrich), 20.0 grams of 85.5% phosphoric acid ($H_3PO_4$), 150 grams of n-methyl-pyrrolidinone (NMP), and 5.2 gram of deionized water being mixed by being shaken in a plastic bottle. The resulting solution was transferred in a 600 ml stainless steel pressure vessel and heated at 250° C. for 3 hours while the solution was continuously agitated. The liquid was then evaporated, completely by purging nitrogen gas through the vessel. After the heat was removed and the vessel was cooled to ambient temperature, the powder was poured out from the vessel.

The resulting powder was transferred into a furnace, and subsequently heated at 550° C. for 12 hours under a nitrogen gas atmosphere. The furnace was then cooled to room temperature, and the resulting powder was retrieved from the furnace. The resulting solid powder was evaluated as the cathode material.

Example 2

This Example 2 was prepared in the same manner as Example 1, but the conditions of final heat treatment was for 18 hours at 650° C.

Example 3

Example 3 was also was prepared in the same manner as Example 1, but the solid powder was heated at 700° C. for 8 hours.

Example 4

Example 4 was also prepared in the same manner as Example 1, but the conditions of final heat treatment was for 18 hours at 750° C.

Example 5

Example 5 was prepared differently than Example 1, in that Example 5 used hydrofluoric acid as the fluoride source (HF) and lithium carbonate ($Li_2CO_3$) as the lithium source. The vanadium and phosphate precursors were the same as those in Example 1. Similarly to Example 1, the precursors were mixed and heated at 250° C. in a pressure vessel for 3 hours. Instead of evaporating the liquid to separate the solid powder from the liquid, regular filtration was used to separate the solid powder from the liquid. Subsequently, the solid powder was transferred into a furnace and heated in nitrogen gas.

Analysis of carbon content—The samples in the above Examples were analyzed for their carbon content in the following manner. A sample size of 2 grams was dissolved in 50 ml of 15 wt % acidic aqueous solution (7 wt % HCl, 5 wt % $HNO_3$, and 3% $H_2SO_4$) at ambient temperature (~22° C.). The insoluble residual solid was separated by filtration, washed thoroughly with deionized water, and dried at 100° C. under vacuum for at least 2 hours. This acid insoluble powder contains mainly elemental carbon, its ash content was obtained by burning in air at 850° C. It was found that the material made in Example 2 contained 3.7% carbon.

Electrochemical evaluation—The powders made in the above examples were evaluated as the cathode material for lithium ion batteries as follows: The powders were fabricated into electrodes (a) and then tested in the coin cells (b) as described below.

Electrode Preparation—A desired amount of the powder was mixed with acetylene carbon black powder, fine graphite powder (<8 μm), and polyvinylidene fluoride (PVDF) solution (NMP as the solvent) to make a slurry. The slurry was cast on 20-μm thick aluminum foil. The slurry coated foil was dried on a hot plate. The dried solid film contained 2% carbon black, 4% graphite, 5% PVDF, and 89% solid powder. The film was trimmed into 5-cm strips and pressed through a hydraulic rolling press so that the density of the solid film was about 2.0 g/cc. The thickness or the mass loading of the solid film was controlled to be about 6 mg/cm$^2$.

Electrochemical tests—Disks of 1.41 cm in diameter were punched out from the pressed films and used as the positive electrode in standard coin cells (size CR2025) with lithium metal as the negative electrode. The separator used in the coin cells was a glass matt (Watman® Glass microfibre filter, GF/B), and the electrolyte was 1 M LiPF$_6$ in a mixture of solvents (40% ethylene carbonate, 30% methyl carbonate, and 30% diethyl carbonate). The test scheme was as follows. The cells were charged under a constant current of 0.5 mA (~50 mA/g) until the cell voltage reached 4.4 volts, and charged further at 4.4 volts for one hour or until the current dropped to below 0.03 mA. Then the cells were discharged at constant current of 0.5 mA until the cell voltage reached 3.0 volts. Charge/discharge cycles were repeated to determine the stability of the capacity during cycling. The capacity of the materials was calculated based on the passed electrical charge during discharging, while the coulombic efficiency was calculated based on the ratio of the discharge capacity to the capacity on charging. All the tests were conducted using an electrochemical test station (Arbin Model BT-2043). All experiments were conducted at room temperature (~22° C.).

Table 1, below, lists the specific capacities and coulombic efficiencies of the materials in the above examples on the 1$^{st}$ and 10$^{th}$ cycles. As the temperature of heat treatment was increased from 550° C. to 750° C., the specific capacity of the materials increased and then decreased. The preferred temperature is higher than 550° C. but is lower than 750° C. The material in Example 3 exhibited a reversible specific capacity of 118 mAh/g. Such a material is useful as cathode material for lithium ion batteries.

TABLE 1

List of specific capacities and coulombic efficiencies of the materials

| | 1st cycle | | 10th cycle | |
| --- | --- | --- | --- | --- |
| Example | Capacity (mAh/g) | Efficiency (%) | Capacity (mAh/g) | Efficiency (%) |
| 1 | 2.4 | 7.0 | 0.7 | 55.0 |
| 2 | 87.7 | 80.7 | 83.9 | 98.1 |
| 3 | 117.1 | 89.2 | 115.7 | 98.4 |
| 4 | 108.4 | 79.9 | 89.4 | 97.5 |
| 5 | 117.2 | 93.0 | 114.2 | 99.0 |

Figure 4:
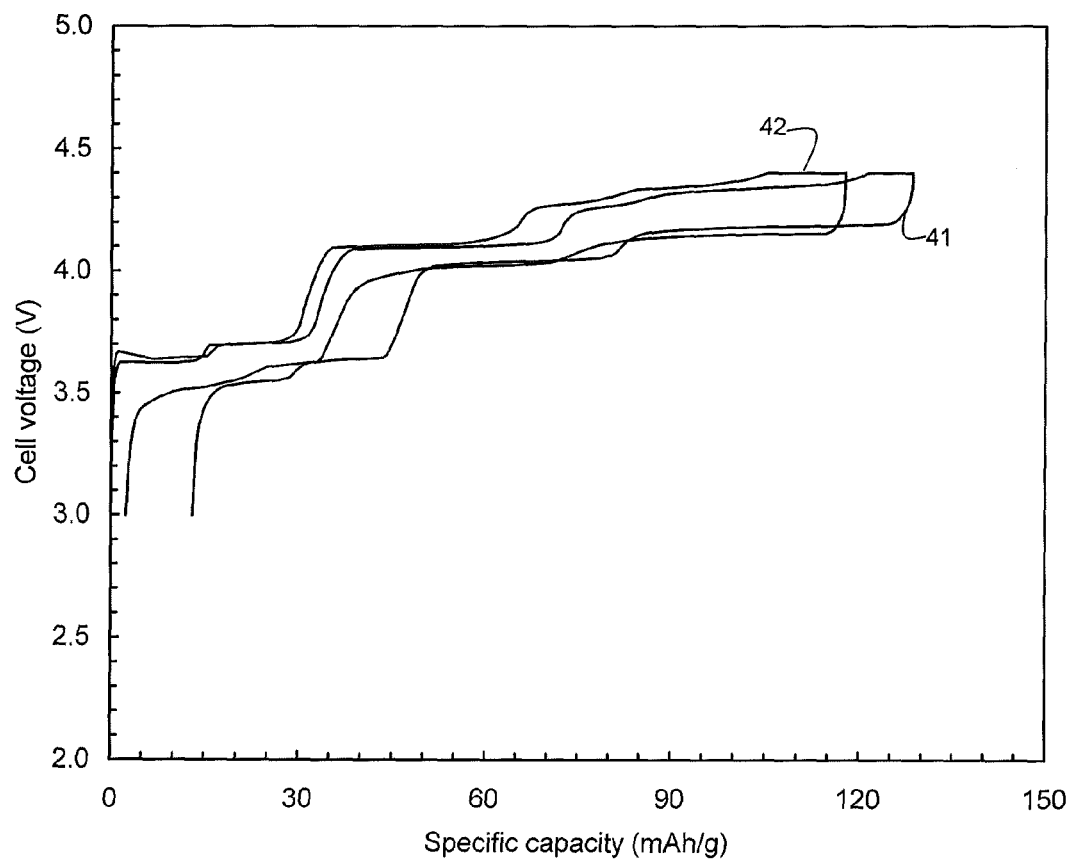
FIG. 4 is a chart showing the electrode potential profiles of powder made from the inventive processes of the present invention.
Figure 5:
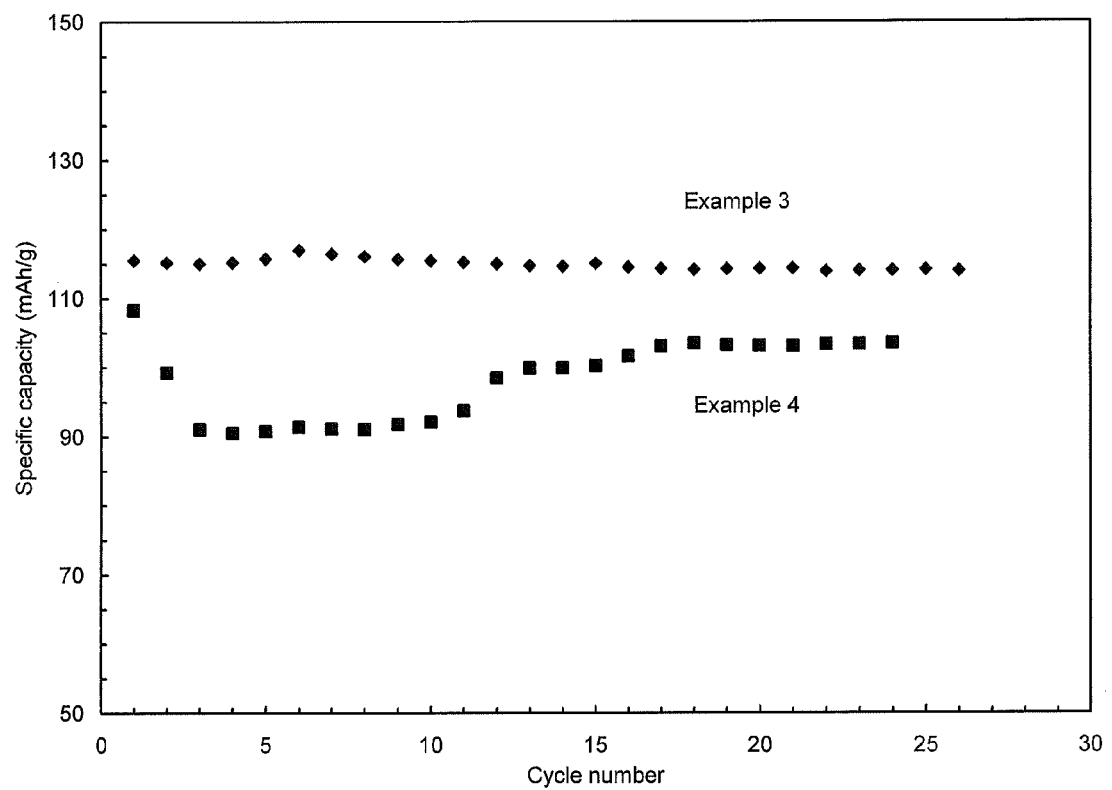
FIG. 5 is a chart showing the specific capacity of powders made using the inventive processes over a number of cycles.

FIG. 4 shows a comparison of the cell voltage profiles between the 1$^{st}$ and 10$^{th}$ cycles for the material in Example 3 where the line 41 indicates the cell voltage profile for the first cycle and the line 42 indicates the cell voltage profile for the tenth cycle. The material exhibits four characteristic plateaus on the electrode potential at these values: 3.56, 3.65, 4.06, and 4.25 volts. The average potential is about 3.96 volts. As shown in FIG. 4, the cell voltage profiles on charging and discharging are fairly symmetric, indicating the charging and discharging processes are very reversible. FIG. 5 shows the specific capacity at different cycle numbers for both the materials in Example 3 and 4. The specific capacity of the material in Example 3 is very stable during cycling, whereas the specific capacity of the material in Example 4 initially decreased and then increased to reach a stable value.

Thus, it has been illustrated that the process according to this invention yielded carbon-containing lithium vanadium fluorophosphate solid powders that exhibit excellent electrochemical properties as cathode materials for Li-ion batteries. This new process is simple, uses least expensive precursors available, and yields easily processing able powders for electrode fabrication, therefore, it is very useful.

Accordingly, the scope of protection is not limited by the description set out above, but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of any reference in this application is not an admission that it is prior art to the present invention, especially any reference that may have a publication date after the priority date of this application.

The invention claimed is:

1. A process comprising:
dispersing and dissolving precursors including a lithium-containing compound, a phosphate-containing compound, a fluorine-containing compound and at least one of vanadium pentoxide (V$_2$O$_5$) or ammonium vanadium oxide (NH$_4$VO$_3$) in an organic solvent/reducing agent to form a suspension-solution;
heating the suspension-solution to cause the organic solvent/reducing agent to reduce vanadium from a 5+ valence state to a 3+ valence state and cause formation of lithium vanadium fluorophosphate solid particles; and
separating the solid particles from liquids to provide a lithium vanadium fluorophosphate cathode battery powder.

2. The process according to claim 1, wherein the lithium-containing compound is a lithium salt.

3. The process according to claim 1, wherein the lithium-containing compound is at least one of lithium carbonate (Li$_2$CO$_3$), lithium hydroxide (LiOH), and lithium fluoride.

4. The process according to claim 1, wherein the phosphate-containing compound is at least one of phosphoric acid (H$_3$PO$_4$) and ammonium phosphate (NH$_4$)$_3$PO$_4$.

5. The process according to claim 1, wherein the organic solvent/reducing agent comprises n-methyl-pyrrolidone (NMP).

6. The process according to claim 1, further comprising binding carbon with the solid particles by selective precipitation of a carbon-residue-forming material after separating the solid particles from the liquid, wherein heating the solid particles in an inert environment crystallizes lithium vanadium fluorophosphate and carbonizes the carbon-residue-forming material.

7. The process according to claim 6, further comprising heating the solid particles to stabilize size and shape of the solid particles after the separating of the solid particles from the liquids and prior to the binding of the carbon with the solid particles.

8. The process according to claim 1, wherein the liquid removed from the solid particles is recycled back to disperse and dissolve additional quantities of the precursors.

9. The process according to claim 1, wherein the separating of the solid particles from the liquids is accomplished by mechanical separation.

10. The process according to claim 1, wherein the separating of the solid particles from the liquids is accomplished by evaporating the liquids from the solid particles.

11. The process according to claim 1, wherein the separating of the solid particles from the liquids is accomplished by mechanical liquid extraction and then by evaporation.

12. A process comprising:

dispersing and dissolving precursors including a lithium-containing compound, a phosphate-containing compound, a fluorine-containing compound and vanadium pentoxide ($V_2O_5$) in an organic solvent/reducing agent to form a suspension-solution;

heating the suspension-solution to a first temperature to cause the organic solvent/reducing agent to reduce vanadium from a 5+ valence state to a 3+ valence state and cause formation of lithium vanadium fluorophosphate solid particles;

separating the solid particles from liquids; and heating the solid particles to a second temperature that is higher than the first temperature to drive formation of a crystalline structure within the lithium vanadium fluorophosphate solid particles and thereby produce lithium vanadium fluorophosphate cathode battery powder.

13. The process according to claim 12, further comprising providing the solid particles with carbon-residue-forming material created by oxidation of n-methyl-pyrrolidone (NMP) and carbonized upon heating the solid particles to the second temperature, wherein carbon content is between 1 and 10 weight percent of the solid particles.

14. The process according to claim 13, wherein the carbon content is between 1 and 3 weight percent of the solid particles.

* * * * *